United States Patent [19]
Leyden et al.

[11] Patent Number: 6,027,277
[45] Date of Patent: Feb. 22, 2000

[54] SECURITY SYSTEM

[75] Inventors: Roger Leyden, Willow Springs; Terrance Surma, Bloomingdale, both of Ill.

[73] Assignee: Se-Kure Controls, Inc., Franklin Park, Ill.

[21] Appl. No.: 09/094,132

[22] Filed: Jun. 9, 1998

[51] Int. Cl.[7] .................................................. G08B 13/14
[52] U.S. Cl. ....................... 403/291; 403/315; 360/568.4; 360/568.2; 248/179.1
[58] Field of Search .................................... 70/18, 30, 49, 70/58; 248/177.1, 178.1, 179.1, 551, 552; 340/568.1, 568.2, 568.4, 427, 549, 548; 403/61, 116, 291, 315, 405.1, 406.1

[56] References Cited

U.S. PATENT DOCUMENTS

| | | |
|---|---|---|
| 1,214,161 | 1/1917 | Hettinger et al. . |
| 4,066,231 | 1/1978 | Bahner et al. ........................... 248/552 |
| 4,068,961 | 1/1978 | Ebner et al. ........................... 403/61 X |
| 5,083,147 | 1/1992 | Nakatani ............................... 248/179.1 |
| 5,119,203 | 6/1992 | Hosaka et al. ................... 248/179.1 X |
| 5,146,205 | 9/1992 | Keifer et al. .......................... 340/568.2 |
| 5,341,124 | 8/1994 | Leyden et al. ........................ 340/568.4 |
| 5,421,667 | 6/1995 | Leyden et al. ....................... 403/291 X |
| 5,641,102 | 6/1997 | Hellweg ................................ 403/61 X |

*Primary Examiner*—Lynne H. Browne
*Assistant Examiner*—John R. Cottingham
*Attorney, Agent, or Firm*—Wood, Phillips, VanSanten, Clark & Mortimer

[57] ABSTRACT

A security assembly for an article to be monitored, which security assembly includes a housing to be secured to a first surface facing in a first direction on an article to be monitored, a stabilizing element defining a shoulder to abut to a surface on the article to be monitored that faces transversely to the first direction, and at least one fastener that maintains the housing and stabilizing element in an operative position on an article to be monitored.

24 Claims, 3 Drawing Sheets

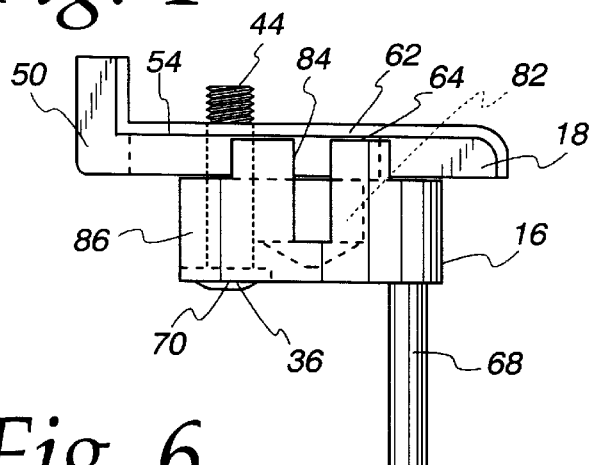
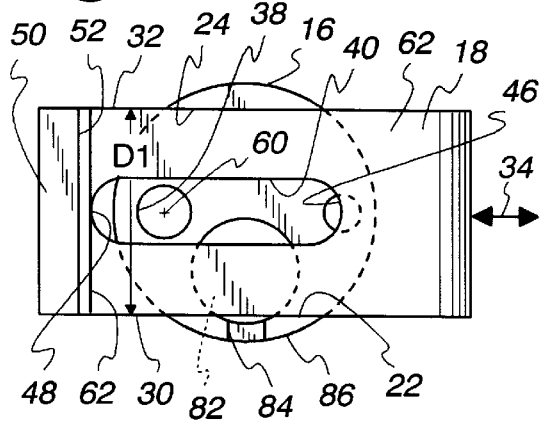
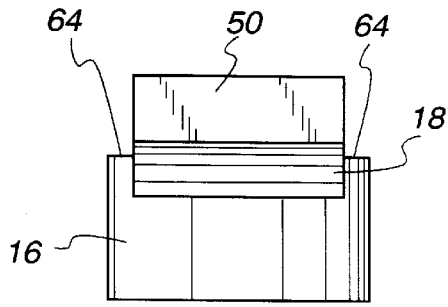
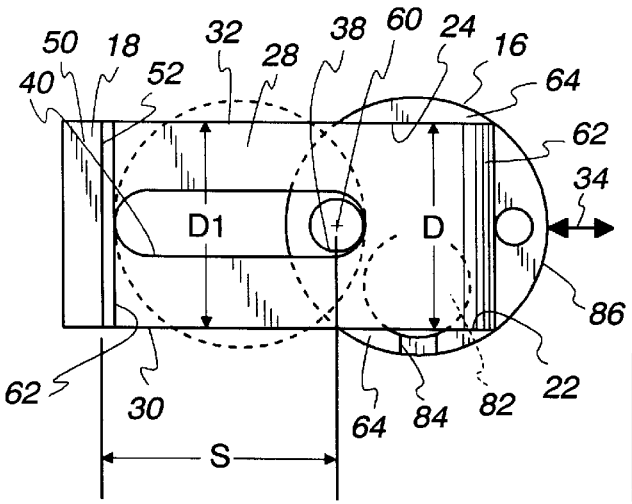
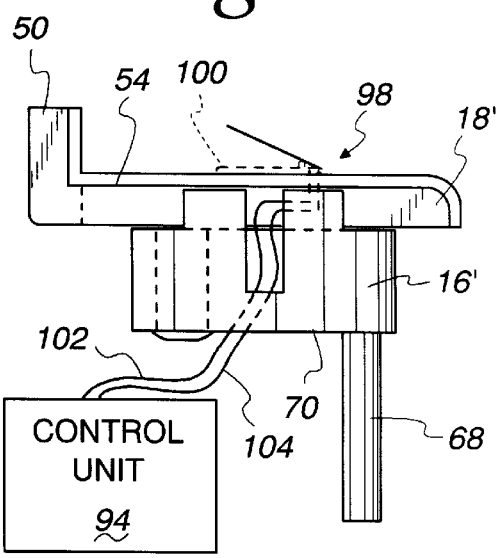

SECURITY SYSTEM

BACKGROUND OF THE INVENTION

1. Field of the Invention

This invention relates to security systems of the type used to prevent the unauthorized removal of an article from a prescribed area.

2. Background Art

Consumer electronic stores typically display a large number of products so as to allow a potential purchaser thereof to pick the products up, inspect them, and potentially effect, or simulate, operation thereof In large display rooms, particularly at times when large numbers of people are present, the potential for theft is heightened. This problem is particularly significant with camera displays. Still and video cameras are becoming ever smaller and lighter in weight. While these features make the cameras more desirable to the consumer, they at the same time make them more prone to theft.

The assignee herein offers a number of products which are used to avoid theft of articles, such as cameras. In U.S. Pat. No. 5,421,667, a mechanical security system is shown utilizing a block/housing which is attached to an article with a bolt using a preexisting, threaded bore in an article to be monitored. The block/housing is used to fixedly maintain one end of a cable tether on the article. The other end of the cable tether is anchored to a support at the desired display area This type of mechanical system, while generally highly effective, can be defeated if the cable tether is severed or the block/housing is removed from the article. In certain constructions, the latter can be accomplished by directly rotating the bolt to effect release thereof, or by rotating the bolt indirectly by turning the block/housing through which the bolt extends.

This system may also incorporate an elongate pin which is offset from the bolt axis and projects from the block/housing into the article. This avoids rotation of the block/housing. However, this system might be defeated by using a tool to exert a substantial torque on the block/housing which effects shearing of the offset pin to thereafter allow turning of the block/housing.

The problem of cable severance has been addressed by other systems developed by the assignee herein. For example, in U.S. Pat. No. 5,341,124, an electronic security system is disclosed which produces an audible and visual alarm as an incident of either a) the block/housing being removed from the article being monitored or b) the conductive tether, which establishes a conductive path between the article and an alarm, being severed.

The above systems have been highly commercially successful and highly effective in deterring theft. However, even if the system is not defeated, attempted removal of the block/housing by rotating the securing bolt through manipulation of the block/housing may inflict damage to oft times expensive products.

Further, a failure in a system may be the result of a selection of a system type that is not optimal for the environment. The electronic security systems are generally more expensive than the mechanical security systems and may not fit within the budget constraints of certain businesses. As a result, some users may opt to use a mechanical system alone that may not be as effective as one incorporating an electronic monitoring capability.

The above problem has become particularly prevalent with the development of more and more products that are small, yet expensive, such as digital cameras.

SUMMARY OF THE INVENTION

The invention is directed to a security assembly for an article to be monitored, which security assembly includes a housing to be secured to a first surface facing in a first direction on an article to be monitored, a stabilizing element defining a shoulder to abut to a surface on the article to be monitored that faces transversely to the first direction, and at least one fastener that maintains the housing and stabilizing element in an operative position on an article to be monitored.

The security assembly may further include a flexible tether having first and second ends, with the first end of the flexible tether maintained on the housing.

The housing and stabilizing element may be guidable, one against the other, between first and second relative positions. The at least one fastener is capable of mounting the housing and stabilizing element in the operative position on an article to be monitored with the housing and stabilizing element in each of the first and second relative positions.

The at least one fastener may be capable of causing the housing and stabilizing element to be fixed in each of the first and second relative positions with the housing and stabilizing element in the operative position.

In one form, one of the housing and stabilizing element has first and second spaced and facing surfaces and the other of the housing and stabilizing element moves between and guidingly against the first and second spaced and facing surfaces as the housing and stabilizing element move between the first and second relative positions.

The housing and stabilizing element may move relative to each other in a substantially straight line between the first and second relative positions.

The security assembly may include an elongate tether having first and second ends and an enlargement on the first end of the elongate tether. The housing has a cavity to receive the enlargement on the first end of the elongate tether. The stabilizing element may captively block the enlargement in the housing cavity with the housing and stabilizing element in each of the first and second relative positions.

In one form, the flexible tether includes at least two electrical conductors which define first and second conductive paths between the first and second ends of the flexible tether.

In one form, the at least one fastener is a threaded fastener with a central axis. The threaded fastener is extendable through the housing and into an article to be monitored. The shoulder on the stabilizing element faces the central axis of the threaded fastener and is spaced from the central axis a) a first distance with the housing and stabilizing element in the first relative position and b) a second distance that is different than the first distance with the housing and stabilizing element in the second relative position.

The stabilizing element may have a surface which is substantially perpendicular to the shoulder on the stabilizing element.

A resilient material may be provided on at least one of the surface of the stabilizing element and the shoulder on the stabilizing element to protect an article to be monitored by the security assembly with the housing and stabilizing element in the operation position.

In one form, with the housing and stabilizing element in the operative position, no part of the housing directly contacts the article to be monitored.

The stabilizing element may have an elongate slot therein, with the threaded fastener extending through the elongate slot with the housing and stabilizing element in the operative position.

The housing and stabilizing element may be movable relative to each other.

The invention is also directed to the combination of an article to be monitored and a security assembly. The article to be monitored may include a case with a first surface with a substantially first flat portion and a second surface with a substantially second flat portion, with the first and second flat portions being at an angle with respect to each other. A threaded bore may be provided through the first surface. The security assembly includes a housing, a stabilizing element having a shoulder and a third surface that is angularly disposed in relationship to the shoulder, and a fastener with a central axis. The fastener extends into the housing, the stabilizing element, and the threaded bore through the first surface and maintains the stabilizing element fixedly on the article to be monitored with the third surface situated relative to the second surface such that rotation of the housing and stabilizing element around the central axis of the fastener causes the second and third surfaces to abut and limit rotation of the housing and stabilizing element around the central axis.

In one form, the stabilizing element has a fourth surface that is substantially perpendicular to the third surface and abutted to the first surface with the second surface abutted to the third surface.

BRIEF DESCRIPTION OF THE DRAWINGS

FIG. 4 is a side elevation view of the inventive security assembly;

FIG. 5 is an end elevation view of the security assembly of FIG. 4;

FIG. 6 is a plan view of the security assembly of FIGS. 4 and 5;

FIG. 7 is a view as in FIG. 6 with the housing and stabilizing element on the security assembly in two different relative positions; and FIG. 8 is a side elevation view of a modified form of security assembly according to the present invention with a modified form of electrical monitoring capability incorporated therein.

DETAILED DESCRIPTION OF THE DRAWINGS

Figure 1:
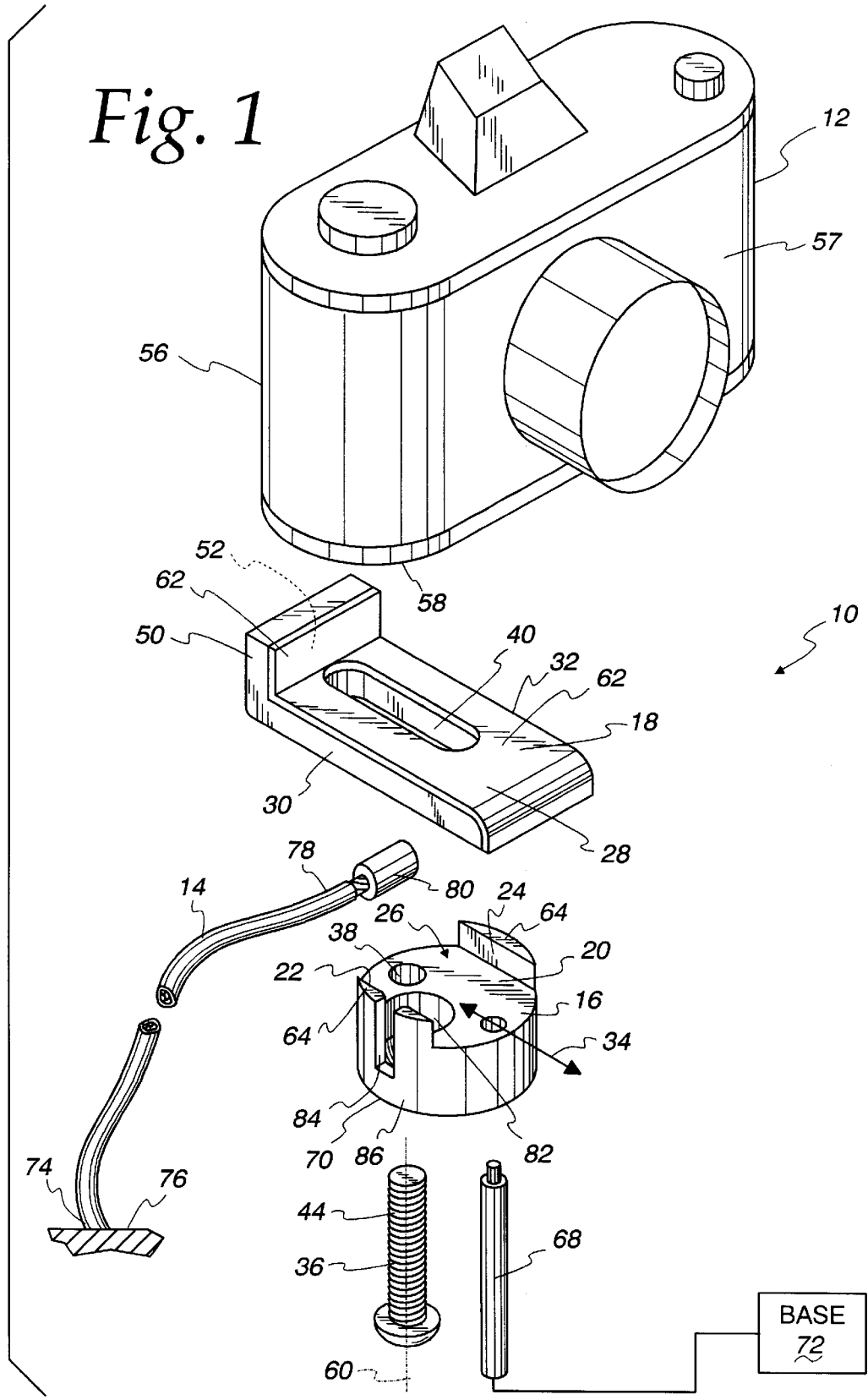
FIG. 1 is a exploded perspective view of a security system, according to the present invention, including a security assembly for monitoring, in this case, a camera.

Referring initially to FIGS. 1, 2 and 4–7, a security assembly, according to the present invention, is shown at 10. The security assembly 10 is a mechanical-type system which is designed to monitor a portable article, in this case a camera 12. The security assembly 10 and camera 12 together define a security system. The security assembly 10 can be used to monitor any type of article to be maintained within a prescribed range as determined by an elongate, flexible tether 14.

The security assembly 10 includes a disk-shaped block/housing 16 and an L-shaped stabilizing element 18. The housing 16 has an undercut, upwardly facing surface 20. The undercut produces two diametrically opposite, spaced, facing surfaces 22, 24 which, in conjunction with the surface 20, define an upwardly opening, U-shaped receptacle at 26 for the stabilizing element 18. The surfaces 22, 24 are substantially flat and parallel to each other and spaced by a distance D. The stabilizing element 18 has a rectangular body 28 with two parallel edges 30, 32 spaced from each other a distance D1, that is slightly less than the distance D, so that the housing 16 and stabilizing element 18, through the surfaces 22, 24 and edges 30, 32 are guidable one against the other in the line of the double-headed arrow 34.

Figure 2:
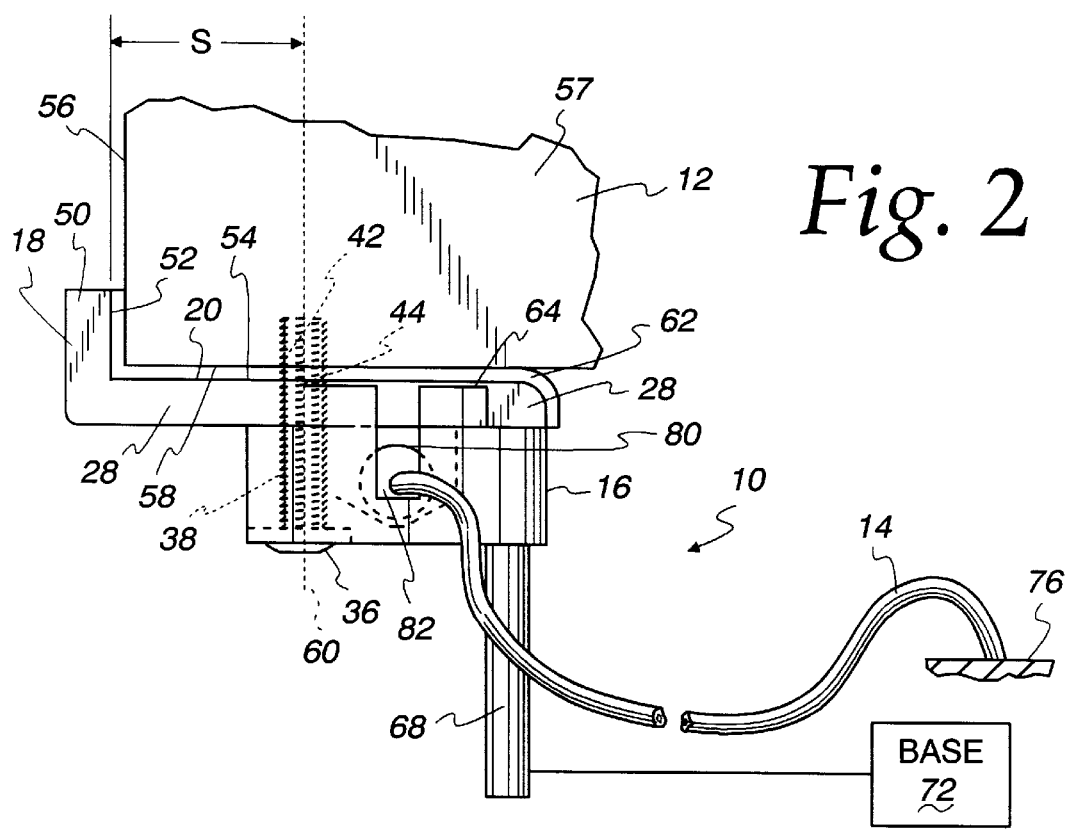
FIG. 2 is a fragmentary, side elevation view of the security system in FIG. 1 with a housing and stabilizing element on the security assembly in an operative position on the camera.

To place and maintain the housing 16 and stabilizing element 18 in an operative position on the camera 12, as shown in FIG. 2, a threaded fastener 36 is employed. The fastener 36 is extended upwardly through an opening/bore 38 through the housing 16, through an elongate opening/slot 40 through the stabilizing element body 28, and into a threaded, blind bore 42 in the camera 12. The major axis of the slot 40 is substantially parallel to the edges 30, 32 so that a threaded shank 44 on the fastener 36 moves guidingly within the slot 40 as the housing 16 and stabilizing element 18 are relatively repositioned in the line of the double-headed arrow 34. The housing 16 and stabilizing element 18 are thus relatively repositionable between a) a first position, shown in solid lines in FIG. 7, wherein the fastener shank 44 is in one portion of the slot 40 and abuts to an edge 46 at one end of the slot 40 and b) a second position wherein the fastener shank 44 abuts to an edge 48 at the opposite end of the slot 40. The housing 16 and stabilizing element 18 are thus captive between an enlarged head on one end of the fastener shank 44 and the camera 12.

The body 28 has an upstanding wall 50 which defines a flat shoulder 52 that is substantially perpendicular to an upwardly facing, flat, article support surface 54 on the body 28. The shoulder 52 and surface 54 cooperatively define an L-shaped seat for the article to be monitored, in this case the camera 12. The shoulder 52 is designed to be abuttable to one exposed, external surface 56 on the camera case 57, with the surface 54 designed to be abutted to a transverse, exposed, external surface 58 on the case 57.

With the fastener 36 extended through the housing 16 and stabilizing element 18, the shoulder 52 faces the central axis 60 of the fastener 36. A spacing S between the shoulder 52 and the fastener axis 60 is variable by relatively repositioning the housing 16 and stabilizing element 18 between the first and second relative positions therefor. With this arrangement, a universal construction for the housing 16 and stabilizing element can be used and will accommodate a range of different article configurations. For example, in FIG. 3, a camera 12' is shown wherein a blind bore 42', corresponding to the bore 42, is closer to the rear camera surface 56' than the bore 42 is to the corresponding rear surface 56 on the camera 12 in FIG. 2. With the adjustment capability, the shoulder 52 can be directly abutted to each of the rear camera surfaces 56, 56'. While direct abutment is not required, the shoulder 52 should be sufficiently close to the surfaces 56, 56' that the wall 50 will abut to the camera surface 56, 56' if an attempt is made to rotate the fastener 36 by manipulation of the housing 16 and stabilizing element 18.

To avoid damage to the article 12, 12' being monitored, a resilient layer 62, made of rubber, or the like, may be disposed over the shoulder 52 and surface 54 to both act as a cushion between the stabilizing element 18 and the article 12, 12' and increase the coefficient of friction between the housing 16 and stabilizing element 18 and the article 12, 12' with the stabilizing element 18 drawn positively against the article 12, 12' through the fastener 36.

Preferably, the upper edges 64 of the housing 16 do not extend upwardly to the height of the surface 54 and the stabilizing element 18. This avoids potential marring of the article 12, 12' by the edges 64 with the housing 16 and stabilizing element 18 in the operative position on the article being monitored.

A mounting post 68 projects in cantilever fashion from the underside 70 of the housing 16. The mounting post 68 can be placed in a receptacle on a pedestal or other type of mounting base 72 to thereby maintain the article 12, 12', with the housing 16 and stabilizing element 18 in an operative position thereon, in an upright and readily accessible position to be handled by a potential purchaser.

To secure the article 12, 12' and security assembly 10 at a desired location, a mechanical arrangement is shown in FIGS. 1 and 2. The tether 14 may be an elongate, flexible, metal cable with a first end 74 that is anchored to a base 76 and a second end 78 with an enlargement 80 thereon. The enlargement 80 may be a metal element that is crimped onto the tether cable 14.

The housing 16 has a cavity 82 formed through the surface 20. The cavity 82 can be formed by a blind bore. A slot 84 is formed in the peripheral wall 86 at the housing 16 to accept the cable diameter on the tether 14. This allows introduction of the enlargement 80 into the cavity 82. The slot 84 has a circumferential width that is small enough that it will not allow passage therethrough of the enlargement 80. With this arrangement, the enlargement 80 can be directed into the cavity 82 as the tether cable 14 is advanced downwardly through the slot 84. With the stabilizing element 18 in place within the receptacle 26, the stabilizing element 18 blocks the enlargement 80 within the cavity 82 with the housing 16 and stabilizing element 18 in both the first and second relative positions, as previously described.

Figure 3:
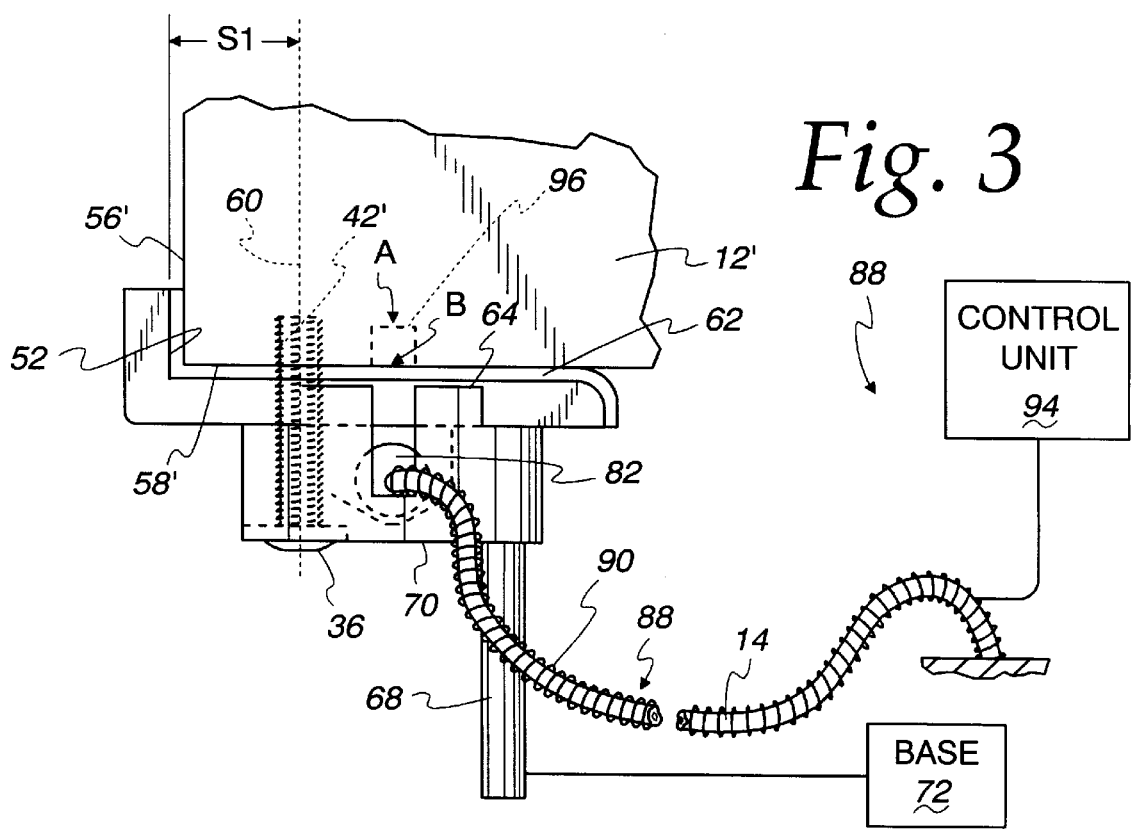
FIG. 3 is a view as in FIG. 2 with the security assembly configured to have both a mechanical and electrical monitoring capability.

In FIG. 3, a modification is shown wherein the tether 14 is assembled as in FIGS. 1 and 2 and with the mechanical tether 14 supplemented by an electrical security assembly 88. The security assembly at 88 includes a conductive element 90 that is wrapped around the tether cable 14 and defines a plurality of conductive paths between the housing 16 and a control unit 94. A conventional type button 96 is depressible from the position shown at A to a position shown at B as it is pressed upwardly against the article 12'. As the button 96 moves from the B position to the A position, there is break in at least one conductive path which is sensed by the control unit 94, which produces an audible and/or visual alarm. The alarm would be activated in the event that the article 12' was removed from the security assembly 88, as a result of which the button 96 would move from the B position to the A position, or in the event that the conductor 90 was severed.

In FIG. 8, a further modified form of security system, according to the present invention, is shown at 98. The system 98 uses only an electrical monitoring. In this case, a switch 100 is movable between first and second states, as shown in solid lines and dotted lines in FIG. 8. In the first state, the system is deactivated, i.e. a conductive path defined by at least one of two conductors 102, 104 is broken. By movement to the phantom line position, the conductive path is established, which occurs as a result of the housing 16' and stabilizing element 18' being mounted in the operative position to the article 12, 12'.

Accordingly, the invention contemplates the use of strictly mechanical, electrical, or a combination of electrical/mechanical monitoring.

The foregoing disclosure of specific embodiments is intended to be illustrative of the broad concepts comprehended by the invention.

We claim:

1. A security assembly for an article to be monitored, said security assembly comprising:
   a housing to be secured to a first surface on an article to be monitored and facing in a first direction on an article to be monitored;
   a stabilizing element defining a shoulder to abut to a surface on an article to be monitored, the shoulder facing transversely to the first direction;
   at least one fastener that is capable of maintaining the housing and stabilizing element in an operative position on an article to be monitored,
   wherein the housing and stabilizing element are guidable one directly against the other between first and second relative positions and the at least one fastener is capable of maintaining the housing and stabilizing element in the operative position on an article to be monitored with the housing and stabilizing element in each of the first and second relative positions; and
   a flexible cable having first and second ends, the first end of the flexible cable maintained with the housing and stabilizing element with the housing and stabilizing element in the operative position on an article to be monitored.

2. The security assembly according to claim 1 wherein the at least one fastener is capable of causing the housing and stabilizing element to be releasably fixed in each of the first and second relative positions with the housing and stabilizing element in the operative position.

3. The security assembly according to claim 1 wherein one of the housing and stabilizing element has first and second spaced and facing surfaces and the other of the housing and stabilizing element moves between and guidingly against the first and second spaced and facing surfaces as the housing and stabilizing element move between the first and second relative positions.

4. The security assembly according to claim 3 wherein the housing and stabilizing element move translatingly relative to each other in a substantially straight line between the first and second relative positions.

5. A security assembly for an article to be monitored, said security assembly comprising:
   a housing to be secured to a first surface on an article to be monitored and facing in a first direction on an article to be monitored;
   a stabilizing element defining a shoulder to abut to a surface on an article to be monitored, the shoulder facing transversely to the first direction;
   at least one fastener that is capable of maintaining the housing and stabilizing element in an operative position on an article to be monitored,
   wherein the housing and stabilizing element are guidable one directly against the other between first and second relative positions and the at least one fastener is capable of maintaining the housing and stabilizing element in the operative position on an article to be monitored with the housing and stabilizing element in each of the first and second relative positions; and
   an elongate tether having first and second ends and an enlargement on the first end of the elongate tether, the housing has a cavity to receive the enlargement on the first end of the elongate tether, and the stabilizing element captively blocks the enlargement in the housing cavity with the housing and stabilizing element in each of the first and second relative positions.

6. A security assembly for an article to be monitored, said security assembly comprising:
- a housing to be secured to a first surface on an article to be monitored and facing in a first direction on an article to be monitored;
- a stabilizing element defining a shoulder to abut to a surface on an article to be monitored, the shoulder facing transversely to the first direction;
- at least one fastener that is capable of maintaining the housing and stabilizing element in an operative position on an article to be monitored,
- wherein the housing and stabilizing element are guidable one directly against the other between first and second relative positions and the at least one fastener is capable of maintaining the housing and stabilizing element in the operative position on an article to be monitored with the housing and stabilizing element in each of the first and second relative positions; and
- a flexible tether having first and second ends and the first end of the flexible tether is maintained on the housing,
- wherein the flexible tether comprises at least one electrical conductor which defines a conductive path.

7. The security assembly according to claim 1 wherein the at least one fastener comprises a threaded fastener that is extendable through the housing and into an article to be monitored.

8. The security assembly according to claim 1 wherein the stabilizing element has a surface which is substantially perpendicular to the shoulder on the stabilizing element.

9. The security assembly according to claim 8 wherein there is a resilient material on at least one of the surface of the stabilizing element and the shoulder on the stabilizing element to protect an article to be monitored by the security assembly with the housing and stabilizing element in the operative position.

10. The security assembly according to claim 1 wherein with the housing and stabilizing element in the operative position, no part of the housing directly contacts an article to be monitored.

11. The security assembly according to claim 7 wherein the stabilizing element has an elongate slot therein and the threaded fastener extends through the elongate slot with the housing and stabilizing element in the operative position.

12. In combination:
a) an article to be monitored comprising:
- a case with a first exposed, external surface with a substantially first flat portion and a second exposed, external surface with a substantially second flat portion, with the first and second flat surface portions at an angle with respect to each other,
- there being a pre-threaded bore through the first surface portion; and b) a security assembly for the article to be monitored, said security assembly comprising:
- a housing;
- a stabilizing element having a shoulder and a third surface that is angularly disposed in relationship to the shoulder; and
- a fastener with a threaded shank and an enlarged head on the threaded shank and a central axis and the fastener i) extends into the housing, the stabilizing element and the pre-threaded bore through the first surface so that the housing and stabilizing element are captive between the fastener head and the first surface and ii) maintains the stabilizing element fixedly on the article to be monitored with the third surface situated relative to the second surface such that rotation of the housing and stabilizing element around the central axis of the fastener causes the second and third surfaces to abut and limit rotation of the housing and stabilizing element around the central axis.

13. The combination according to claim 12 further comprising a tether having first and second ends and the first end of the tether is maintained on the housing.

14. The combination according to claim 12 wherein the housing and stabilizing element are guidable one against the other between first and second relative positions, the third surface being spaced from the central axis of the fastener a first distance with the housing and stabilizing element in the first relative position and a second distance that is different than the first distance with the housing and stabilizing element in the second relative position.

15. The combination according to claim 14 wherein the fastener is capable of fixing the housing and stabilizing element to the article to be monitored with the housing and stabilizing element in each of the first and second relative positions.

16. The combination according to claim 14 wherein one of the housing and stabilizing element has first and second spaced and facing surfaces and the other of the housing and stabilizing element moves between and guidingly against the first and second spaced and facing surfaces as the housing and stabilizing element move between the first and second relative positions.

17. In combination:
a) an article to be monitored comprising:
- a case with a first exposed, external surface with a substantially first flat portion and a second exposed, external surface with a substantially second flat portion, with the first and second flat surface portions at an angle with respect to each other,
- there being a threaded bore through the first surface; and b) a security assembly for the article to be monitored, said security assembly comprising:
- a housing;
- a stabilizing element having a shoulder and a third surface that is angularly disposed in relationship to the shoulder;
- a fastener with a central axis and that i) extends into the housing, the stabilizing element and the threaded bore through the first surface and ii) maintains the stabilizing element fixedly on the article to be monitored with the third surface situated relative to the second surface such that rotation of the housing and stabilizing element around the central axis of the fastener causes the second and third surfaces to abut and limit rotation of the housing and stabilizing element around the central axis; and
- an elongate tether having first and second ends and an enlargement on the first end of the elongate tether, the housing has a cavity to receive the enlargement on the first end of the elongate tether and the stabilizing element captively blocks the enlargement in the housing cavity with the housing and stabilizing element in each of the first and second relative positions.

18. The combination according to claim 12 wherein the stabilizing element has a fourth surface that is substantially perpendicular to the third surface and abutted to the first surface and the second surface is abutted to the third surface.

19. The security assembly according to claim 1 wherein the at least one fastener is extendable through the housing and stabilizing element and into an article to be monitored.

20. The security assembly according to claim 1 wherein the at least one fastener has a central axis, there is a spacing between the central axis of the at least one fastener and the shoulder on the stabilizing element and the spacing between the central axis of the at least one fastener and the shoulder on the stabilizing element changes as the housing and stabilizing elements change between the first and second relative positions.

21. The security assembly according to claim 20 wherein the shoulder on the stabilizing element is substantially flat and a plane containing the flat shoulder on the stabilizing element is substantially parallel to the central axis of the fastener with the housing and stabilizing element in each of the first and second relative positions.

22. The combination according to claim 12 wherein the stabilizing element is captive between the housing and the article.

23. The security assembly according to claim 1 wherein the flexible cable is a metal cable.

24. The security assembly according to claim 1 wherein the flexible cable comprises at least one conductive element defining a conductive path between the first and second ends of the flexible cable.

* * * * *